US009495710B2

(12) United States Patent
Wong et al.

(10) Patent No.: US 9,495,710 B2
(45) Date of Patent: Nov. 15, 2016

(54) SOCIAL NETWORKING MANAGEMENT SERVER

(75) Inventors: Ling Jun Wong, Escondido, CA (US); True Xiong, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 1690 days.

(21) Appl. No.: 12/886,203

(22) Filed: Sep. 20, 2010

(65) Prior Publication Data

US 2012/0072494 A1 Mar. 22, 2012

(51) Int. Cl.
*G06F 15/16* (2006.01)
*G06Q 50/00* (2012.01)
*G06F 17/30* (2006.01)
*H04L 29/06* (2006.01)

(52) U.S. Cl.
CPC ........... *G06Q 50/01* (2013.01); *G06F 17/3089* (2013.01); *H04L 63/0815* (2013.01)

(58) Field of Classification Search
USPC ........................................................ 709/204
See application file for complete search history.

(56) References Cited

U.S. PATENT DOCUMENTS

| 7,673,327 B1* | 3/2010 | Polis et al. .................. 726/5 |
| 2005/0203968 A1* | 9/2005 | Dehghan et al. ............. 707/203 |
| 2006/0155698 A1* | 7/2006 | Vayssiere .................... 707/6 |
| 2008/0104128 A1* | 5/2008 | Drayer et al. ................ 707/200 |
| 2009/0300502 A1 | 12/2009 | Johnson et al. |
| 2010/0114788 A1 | 5/2010 | White et al. |
| 2010/0122174 A1 | 5/2010 | Snibbe et al. |
| 2011/0047229 A1* | 2/2011 | Sinha et al. ................ 709/206 |

OTHER PUBLICATIONS

"Weather Central 3D: Live Fusion adds social networking tools", http://broadcastengineering.com/automation/weather-central-3dlive-fusion-adds-social-netowrking-2010421/, Apr. 21, 2010.
"LCD TV Vizio seri XVT", http://www.itechdiary.com/lcd-tv-vizio-seri-xvt-can-be-connected-to-social-networking-and-has-a-qwerty-remote.html.

* cited by examiner

*Primary Examiner* — Thomas Dailey
(74) *Attorney, Agent, or Firm* — John L. Rogitz

(57) ABSTRACT

A social media management server (MS) provides a single authentication point for a client device to log in to multiple social networking accounts. Through the MS, the client device can pull social networking updates to it or have them pushed to the client device. Also, the MS provides a set of APIs for all enabled client devices to interact with social networking sites/services. The MS updates APIs between itself and the social networking sites/services without changing the APIs between itself and client devices in that only mandatory changes in the MS-to-social networking servers APIs are propagated to the APIs between the MS and client devices to reduce the API update requirements on the client side.

12 Claims, 3 Drawing Sheets

LOGIC FOR
INITIALIZATION/AUTHENTICATION

LOGIC FOR
API CHANGE

"PULL" LOGIC

"PUSH" LOGIC

"PUSH" UPDATE SELECTION USER INTERFACE

UPDATE DISPOSITION USER INTERFACE

SEND UPDATE USER INTERFACE

SOCIAL NETWORKING MANAGEMENT SERVER

FIELD OF THE INVENTION

The present application relates generally to social networking management servers for managing user access to multiple user social networking accounts.

BACKGROUND OF THE INVENTION

"Social media" is term that encompasses an Internet subset: websites that primarily allow users to interact with each other in a variety of ways. Well known social media sites include Facebook®, Twitter®, and MySpace®. A social network service, typically embodied by a social network server on the Internet, focuses on the online building and reflecting social networks or social relations among people, e.g., who share interests and/or activities. The process of building online communities through social networking Internet sites hosted by social networking Internet servers is often accomplished both through 'groups' and 'friends lists' that allow greater interaction on websites. Social networking sites allow people to easily and simply create their own online page or profile and to construct and display an online network of contacts. Such sites have met with success: more than four in five US online adults now participate in or consume social media at least once a month. Almost one-quarter of U.S. online adults are creators, i.e., people who write blogs, upload original audio or video to their online "friends", or post stories online.

As understood, as social networking sites proliferate, users often become members of multiple sites. As also understood herein, managing the various authorizations to log on to multiple sites along with contending with varying and different application programming interfaces (APIs) provided by the various sites can grow into time consuming tasks, as many user typically wish to exchange the same information over more than a single social networking site simultaneously.

SUMMARY OF THE INVENTION

Accordingly, a computing device includes a processor and a video display controlled by the processor. The processor presents on the video display a user interface (UI) to enable a user to manage plural social networking accounts. The processor sends to a management server (MS) information related to plural social networking site accounts in which a user of the client device is enrolled, with the client device subsequently logging in to the plural social networking accounts by a single login with the MS.

In some embodiments, once login by the client device at the MS is successful, the client device presents a list of all the current social networking accounts, thereby enabling a user to select one or more accounts and interact with each or all of them directly. Data transfer and communication do not go through the MS but rather are communicated directly between the client device and an appropriate social networking site server (SS).

As set forth further below, if desired the processor causes a pull UI to be presented on the display to enable a user to pull related update/notification RSS feeds from one or more SS. Additionally or in lieu of the pull UI the processor may cause a push UI to be presented on the display to enable a user to cause the MS to request updates from all SS with which the user has accounts, using the account information provided by the user. The client device receives the updates through the MS.

In non-limiting examples the push UI permits the user to select to have updates from all social networking accounts of the user or to select only specific social networking accounts from which updates are pushed. The processor may further cause a disposition UI to be presented on the display to allow a user to select what to do with updates received from a SS. The disposition UI can enable a user to select to have updates automatically pop up on the display as the updates are received or stored in an inbox for later access.

In another aspect, a social media management server (MS) provides a single authentication point for a client device to log in to multiple social networking accounts. The MS provides a set of application programming interfaces (APIs) for the client device to interact with social networking servers (SS). Also, the MS updates at least some APIs between itself and the SS without changing APIs between itself and the client device in that only mandatory changes in MS-to-SS APIs are propagated to APIs between the MS and client device.

In another aspect, a method includes using a management server (MS) as a single login gateway for a client to log in to plural social networking site servers (SS) using a single user name and password sent to the MS. The method also includes updating application programming interfaces (API) between the MS and client device responsive to a determination that an API between the MS and a SS has been changed with a mandatory change and not updating API between the MS and client device responsive to a determination that an API between the MS and a SS has been changed with a non-mandatory change.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
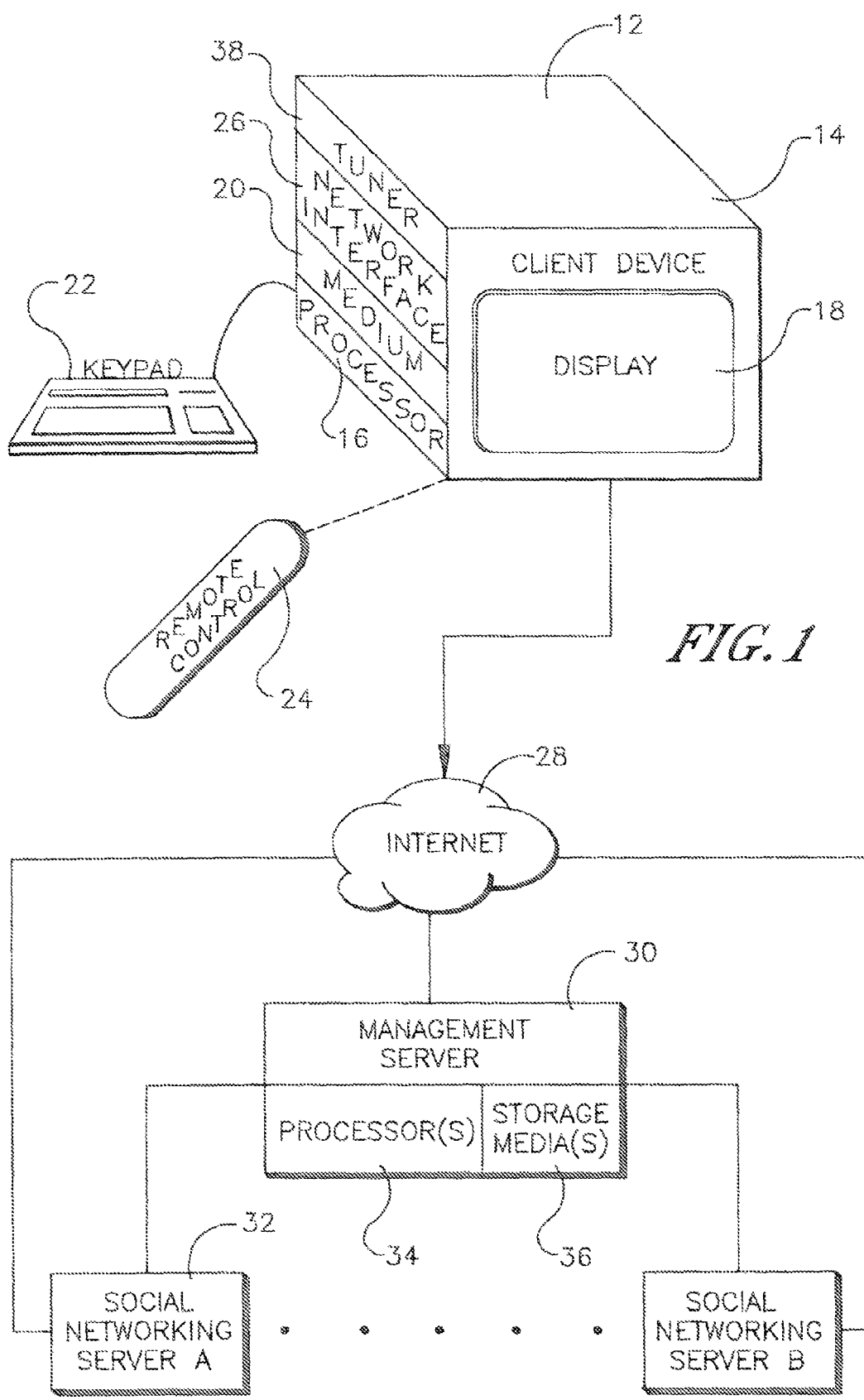
FIG. 1 is a block diagram of an example system in accordance with present principles, schematically showing interior components of the client device, with the client device being implemented in this example by a TV.

Referring initially to FIG. 1, a social networking client device 12 such as a TV (as shown) or a personal digital assistant, laptop computer, personal computer (PC), "smart" wireless telephone, etc. includes a housing 14 bearing a digital processor 16. The processor 16 can control a visual display 18 and an audible display such as one or more speakers. The processor 16 may access a media player module such that the device 12 has media decoding capability.

To undertake present principles, the processor 16 may access one or more computer readable storage media 20 such, as but not limited to RAM-based storage, a chip implementing dynamic random access memory (DRAM)) or flash memory or disk storage. Software code implementing present logic executable by the device 12 may be stored on one of the memories shown to undertake present principles. Also, one or more Internet browsers may be stored on the medium 20 and executed by the processor 16 to access servers on the Internet.

The processor 16 can receive user input signals from various input devices, including a keyboard or keypad 22 (hereinafter "keypad" without loss of generality), a point and click device such as a TV remote control (RC) 24, etc. A network interface 26 such as a wired or wireless modem or wireless telephony transceiver may also be provided and may communicate with the processor 16 so that information can be exchanged between the client device 12 over the Internet 28 with a social networking management server (MS) 30 and plural social networking site servers (SS) 32. The MS server 30 includes one or more server processors 34 and one or more server storage devices 36 bearing computer readable instructions that may be accessed by the processor 34 to execute relevant logic discussed below. The memories herein are contemplated to be non-transitory. The SS 32 likewise have respective processors and computer readable storage media. When the client device 12 is embodied as a TV as shown, it includes a TV tuner 38.

In accordance with present principles and as described more fully below, the client device 16 is enabled to both pull social networking "really simple solution" (RSS) feeds from the SS 32 and to have such feeds pushed to it. Such RSS feeds typically are for publishing frequently updated works such as blog entries, audio, and video and usually include text and metadata such as publication date and author name. These feeds benefit social networking site "friends" who wish to subscribe to timely updates from other members of the social network.

Furthermore, as discussed below present principles provide for a seamless and single set of APIs between the MS 30 and various types of client devices so that API changes on the client side are minimized. Also, the MS 30 manages house-keeping and changes with social networking services' APIs and provides authentication for client devices. Data communication bandwidth of the MS 30 is reduced because client devices communicate directly with the SS 32 after authentication, so that any necessary scaling can be done by the SS 32.

Figure 2:
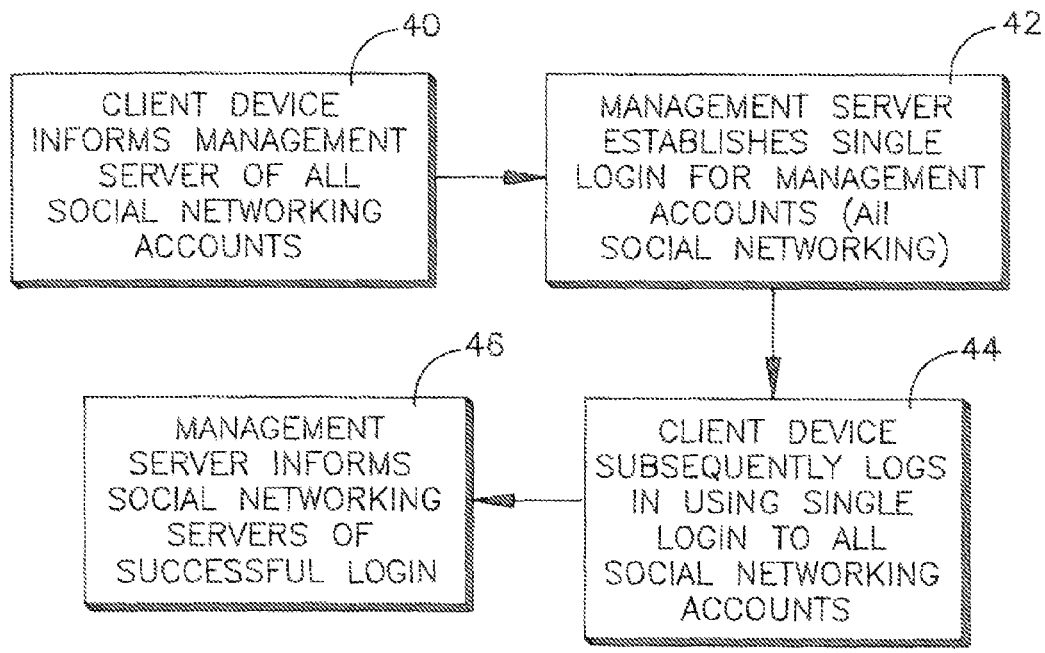
FIG. 2 is a flow chart of example logic for initialization and combined authentication.

Now referring to FIG. 2, at block 40 the client device 12 informs the MS 30 of all the social networking site accounts the user of the client device is enrolled in. Proceeding to block 42 the MS 30 establishes a single login for a management account for the client device 12 by which the client device 12 can log in simultaneously to all social networking sites to which it belongs. In one example embodiment the MS 30 does this by presenting a UI on the client device 12 instructing the user to enter a universal social networking site name and password. Then, at block 44, for subsequent user logins to the MS 30 the MS 30 determines whether authentication is successful. If so, at block 46 the MS 30 automatically logs the client device 12 onto the various SS 32 associated with the user's social networking sites by using the account information provided at block 40 and specifically by providing the respective user name and password to each SS 32.

Once login by the client device 12 at the MS 30 (and, hence, the SS 32) is successful, the client device 12 is presented with a list of all the current social networking services. The client device enables a user to select one or more services and interacts with each or all of them directly. After this point, data transfer and communication does not go through the MS 30 but rather is between the client device 12 and appropriate SS 32.

Figure 3:
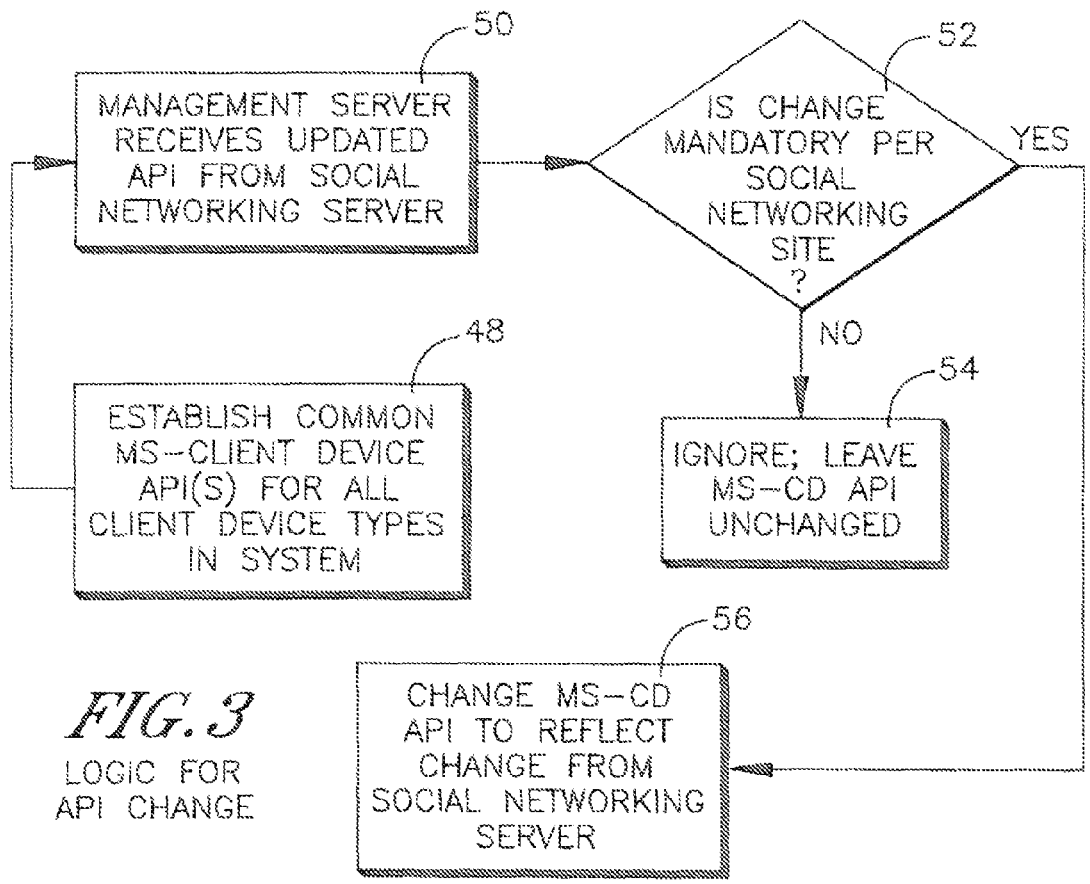
FIG. 3 is a flow chart of example logic for implementing an API change from a social networking server.

FIG. 3 shows that at block 48 the MS 30 provides a set of APIs with which all system networked devices including the client device 12 interact with the MS 30 and, hence, with respective social networking sites/services hosted by the SS 32. In general, at block 50 the MS 30 receives updated APIs between itself and the SS 32 and if a determination is made at decision diamond 52 that the change is a mandatory one the change is ignored at block 54 for purposes of changing the client device 12 APIs with the MS 30. Only if a determination is made at decision diamond 52 that the change is mandatory does the MS 30 change the client device 12 APIs with the MS 30. The APIs for the client device 12 thus remain little changed.

As an example, suppose a SS 32 determines that it wishes to add a field requesting the user's salary. Such information normally is not required by Internet servers, but is optional on the user's part. Accordingly, in such a scenario the client device API would remain unchanged, with the MS 30 simply ignoring the salary request from the SS 32. On the other hand, if a SS 32 changes its privacy policy and mandates that users agree to the change, then the MS 30 propagates the API change at block 56 to change the client device API accordingly.

Figure 4:
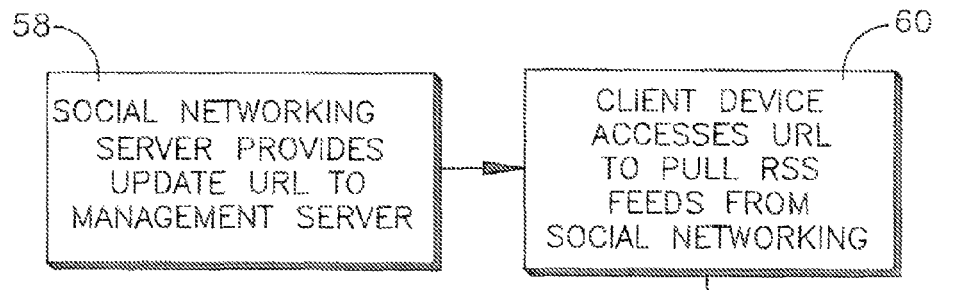
FIG. 4 is a flow chart of example logic for pulling social networking updates to the client device.

Now moving to FIG. 4, at block 58 the SS 32 receiving a social networking site update for the user of the client device 12 provides an update address such as a uniform resource locator (URL) to the MS 30. The MS 30 causes the address to be presented to the client device 12 so that a user can click on the link at block 60 to pull related update/notification RSS feeds from the SS 32. At block 62, in response to the user selection the SS 32 sends the RSS feeds to the client device 12. In this way, a device client can receive updates and notification via RSS feeds by "pulling" a URL provided by the social networking service SS 32.

Figure 5:
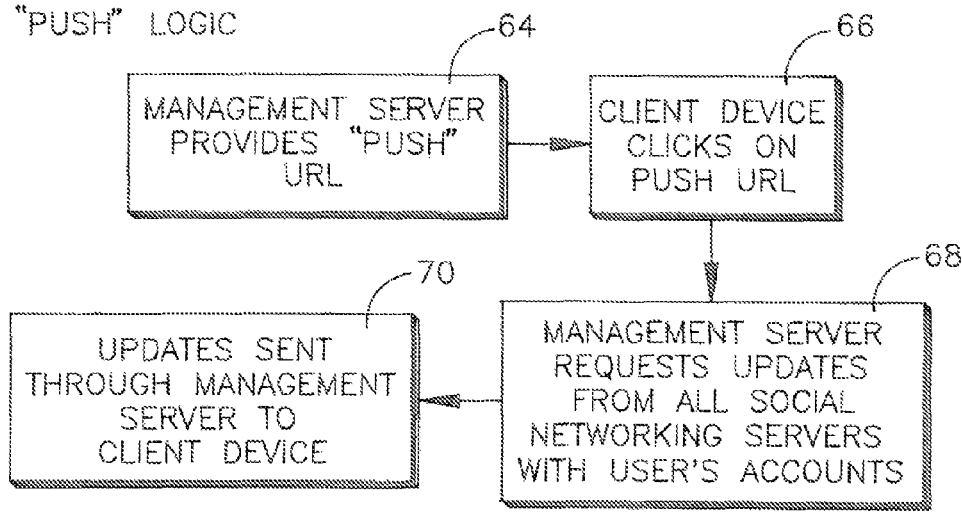
FIG. 5 is a flow chart of example logic for pushing social networking updates to the client device.

In contrast, FIG. 5 shows that the client device 12 may receive such RSS feeds from a SS 32 through a hypertext transfer protocol (HTTP) GET request. Specifically, at block 64 the MS 30 provides a "push" API for all the user's social networking services/sites to post status/updates/notification. The user then points an update/status URL of the client device 12 to this API and for send operations from the client device 12, all of the electronic clients that belong or follow/subscribe to his/her account will receive updates/status/notification in real-time. An example API is:

http://ms.internetv.sony.tv/shareFromWorld/?service_id=4&service_name=Facebook&account_id=104532&timestamp=2010-02-05T10:00:00-

06:00&sig=F2305562068CA0959DE6437EF382GH65&header=this is the header of the status, update or notification&body=this is the message body&geolocation=43.04.50.3.

(ms = MS 32, "sig" is used to verify the authenticity of the HTTP GET). The SS 32 in the above example supports the Facebook service.

For receiving updated from the various SS 32, at block 66 the user of the client device 12 clicks on the push URL causing the MS 30 at block 68 to request updates such as RSS feeds from all SS 32 with which the user has accounts, using the account information provided by the user at block 40 of FIG. 2. Proceeding to block 70, updates are sent by the SS 32 through the MS 30 to the client device 12 albeit without being permanently stored at the MS 30. The client device 12 thus has updates sent from all SS 32 with which it has accounts pushed to it using the logic of FIG. 5.

Figure 6:
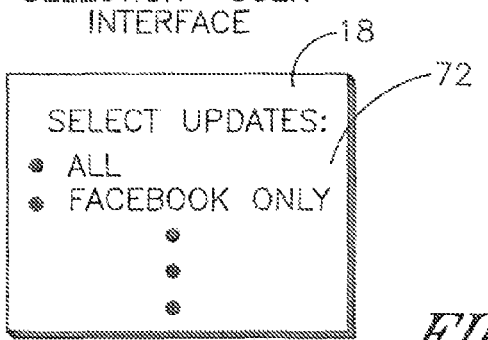
FIG. 6 is a screen shot of an example user interface (UI) for supporting the push logic of FIG. 5.

FIG. 6 shows an example UI 72 that may be presented on the client device display 18 to support the above-described push operation. As shown, the UI 72 permits the user to select to have updates from "all" social networking accounts pushed to it at block 70 or to select only specific social networking accounts from which updates are pushed. The MS 30 requests updates of the SS 32 at block 68 according to the user's selection.

Figure 7:
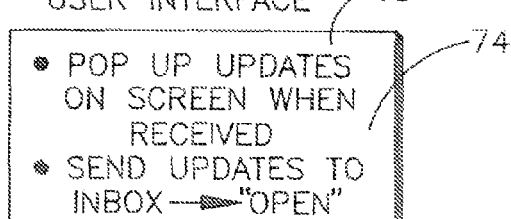
FIG. 7 is a screen shot of an example UI allowing a user to manage how updates are to be presented.

FIG. 7 shows that a UI 74 may be presented on the client device display 18 to enable a user to select what to do with updates received from the SS 32. In the embodiment shown the user can select to have updates automatically pop up on the display 18 as the updates are received, typically in a small window of the display, or stored in an inbox that can be opened later by the user to view the updates. Thus, while watching TV, viewing photos/videos on a camera, playing games on smart phones or game consoles, etc., a user can receive notification/status/updates from his/her friends, family members or co-workers who are members of the user's social networking groups. The user in turn can post his/her comment/status/updates/notification directly from his/her TV or other device that implements present principles, an example non-limiting API for which is (assuming various social networking accounts as indicated):

and necessary communication channel is performed by the MS 30, future social networking services can be easily added/included into the "social networking service lists" that are available to the client devices. The client device does not need to perform a software update to access and enjoy a new social networking service. Once the new social networking service has coordinated information exchange with the MS 30, it can be added and activated by the MS 30.

Figure 8:
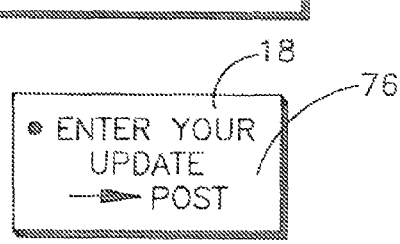
FIG. 8 is a screen shot of an example UI allowing a user to send an update to social networking sites.

FIG. 8 illustrates an example UI 76 that may be presented on the client device display 18 to enable a user to send updates to the user's social networking sites. As shown, a user is prompted to enter an update after which the user may select "post" to cause the update to be sent to the selected SS 32.

While the particular SOCIAL NETWORKING MANAGEMENT SERVER is herein shown and described in detail, it is to be understood that the subject matter which is encompassed by the present invention is limited only by the claims.

What is claimed is:

1. A social media management server (MS) including a computer processor configured for providing a single authentication point for a client device to log in to multiple social networking accounts, the MS configured for providing a set of application programming interfaces (APIs) for the client device to interact with social networking servers (SS), the MS configured for updating at least some APIs between itself and the SS without changing APIs between itself and the client device in that only mandatory changes in MS-to-SS APIs are propagated to APIs between the MS and client device.

2. The server of claim 1, wherein the MS causes a user interface (UI) to be presented on the client device instructing the user to enter a universal social networking site name and password.

Facebook:
http://ms.internetv.sony.tv/shareToWorld/?service_id=4&service_name=Facebook&accou
nt_id=104532&timestamp=2010-02-05T10:00:00-
06:00&sig=F2305562068CA0959DE6437EF382GH65&header=Check out cool
video&body=Video about Sony newest 3-D glassless
TV&geolocation=43.04.50.30&photo=meOnMyNewCouchWatching3-
DBraviaTV.jpg&video=cool3-DBraviaDemo.avi.
Twitter:
http://ms.internetv.sony.tv/shareToWorld/?service_id=3&service_name=Twitter&account
_id=104&timestamp=2010-02-05T10:00:00-
06:00&sig=F2305562068CA0959DE6437EF382GH659934&header=My lazy
status&body=Watching Hancock&geolocation=43.04.50.32.

The interaction with social networking services includes uploading media files (photo, music, video, etc), posting texts (updates, comments, status, etc), getting text updates and notifications via RSS feeds or other scheduling/notification system provided by the social networking service, and broadcasting texts to one or multiple social networking service. The seamless set of API provide a single interface for existing and new client devices to quickly connect and interact with a wide variety of social networking sites. The API enable fast development on the client side since the adherence to the social networking services' APIs have already been established by the MS 30. Since all the client devices use the same set of APIs, and all the house-keeping 3. The server of claim 2, wherein for subsequent user logins to the MS the MS determines whether authentication is successful and responsive to a determination of success the MS automatically logs the client device onto plural SS by using SS account information provided by the client device.

4. Method comprising:
  using a management server (MS) as a single login gateway for a client to log in to plural social networking site servers (SS) using a single user name and password sent to the MS; and
  updating application programming interfaces (API) between the MS and client device responsive to a determination that an API between the MS and a SS has been changed with a mandatory change and not updating API between the MS and client device responsive to a determination that an API between the MS and a SS has been changed with a non-mandatory change.

5. The method of claim 4, further comprising receiving at the MS information related to plural social networking site accounts in which a user of the client device is enrolled.

6. The method of claim 4, further comprising causing a user interface (UI) to be presented on the client device instructing the user to enter a universal social networking site name and password.

7. The method of claim 4, further comprising for user logins to the MS determining whether authentication is successful and responsive to a determination of success automatically logging the client device onto plural SS by using SS account information provided by the client device.

8. The method of claim 4, comprising causes a pull UI to be presented on the client device to enable a user to pull related update/notification RSS feeds from one or more SS.

9. The method of claim 4, further comprising causing a push UI to be presented on the client device to enable a user to cause the MS to request updates from all SS with which the user has accounts, using the account information provided by the user, the client device receiving the updates through the MS.

10. The method of claim 9, comprising causing a push UI to be presented on the display to enable a user to cause the MS to request updates from all SS with which the user has accounts, using the account information provided by the user, the client device receiving the updates through the MS.

11. The method of claim 9, wherein the push UI permits the user to select to have updates from all social networking accounts of the user or to select only specific social networking accounts from which updates are pushed.

12. The method of claim 4, comprising causing a disposition UI to be presented on the client device to allow a user to select what to do with updates received from a SS.

* * * * *